US008634422B2

(12) United States Patent
Sali et al.

(10) Patent No.: US 8,634,422 B2
(45) Date of Patent: Jan. 21, 2014

(54) PRIORITIZATION TECHNIQUES FOR QUALITY OF SERVICE PACKET TRANSMISSION OVER A NETWORK LACKING QUALITY OF SERVICE SUPPORT AT THE MEDIA ACCESS CONTROL LAYER

(75) Inventors: Vipin Sali, San Diego, CA (US); Sriram Nagesh Nookala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 908 days.

(21) Appl. No.: 11/206,451

(22) Filed: Aug. 17, 2005

(65) Prior Publication Data

US 2007/0041385 A1 Feb. 22, 2007

(51) Int. Cl.
*H04L 12/28* (2006.01)
*H04J 3/00* (2006.01)

(52) U.S. Cl.
USPC ...................................... 370/395.21; 370/345

(58) Field of Classification Search
USPC ............ 370/395.21, 345, 230, 465, 387, 335, 370/332; 455/422
See application file for complete search history.

(56) References Cited

U.S. PATENT DOCUMENTS

| | | | | |
|---|---|---|---|---|
| 6,226,301 B1 * | 5/2001 | Cheng et al. | .................. | 370/474 |
| 6,631,122 B1 * | 10/2003 | Arunachalam et al. | ....... | 370/332 |
| 6,747,971 B1 * | 6/2004 | Hughes et al. | ................ | 370/387 |
| 6,781,971 B1 * | 8/2004 | Davis et al. | .................... | 370/329 |
| 6,810,426 B2 * | 10/2004 | Mysore et al. | ................ | 709/234 |
| 6,850,490 B1 * | 2/2005 | Woo et al. | ..................... | 370/230 |
| 7,161,924 B2 * | 1/2007 | Koo et al. | ..................... | 370/338 |
| 7,200,154 B1 * | 4/2007 | Wu et al. | ....................... | 370/468 |
| 7,523,188 B2 * | 4/2009 | Teraslinna | .................... | 709/223 |
| 7,619,969 B2 * | 11/2009 | Lin | ................. | 370/229 |
| 2002/0080737 A1 * | 6/2002 | Koo et al. | ..................... | 370/329 |

(Continued)

FOREIGN PATENT DOCUMENTS

| | | |
|---|---|---|
| EP | 1030484 A2 | 8/2000 |
| WO | WO0010334 | 2/2000 |
| WO | WO2004112318 | 12/2004 |

OTHER PUBLICATIONS

Gruhl S et al: "A demonstrator for real-time multimedia sessions over 3<rd> generati on wirel ess networks" Multimedia and Expo, 2000. ICME 2000. 2000 IEEE International Conference on New York, NY, USA Jul. 30-Aug. 2, 2000, Piscataway, NJ, USA,IEEE, US, vol. 2, Jul. 30, 2000, pp. 959-962, XP010513168 ISBN: 0-7803-6536-4.

(Continued)

*Primary Examiner* — Mark Rinehart
*Assistant Examiner* — Angel Brockman
(74) *Attorney, Agent, or Firm* — Kevin T. Cheatham

(57) ABSTRACT

This disclosure is directed to packet scheduling techniques for prioritizing packets in the first generation (1X) evolution data optimized (EV-DO) network or similar networks that do not provide quality of service (QoS) support at the media access control (MAC) level. The techniques make use of a plurality of prioritized queues that are organized into packet flows. The different packet flows associate packets having similar or identical radio link protocols (RLPs) in order to achieve the necessary error detection for such related packets. The different queues define packet priorities base on packet type, in order to give transmission priority to certain types of packets over other types of packets. By separating the packets into different prioritized queues and associating several queues into common packet flows, prioritization can be achieved along with an efficient implementation of different error detection schemes.

38 Claims, 4 Drawing Sheets

(56) References Cited

U.S. PATENT DOCUMENTS

| | | | |
|---|---|---|---|
| 2003/0120795 A1* | 6/2003 | Reinshmidt | 709/232 |
| 2003/0231594 A1* | 12/2003 | Xu et al. | 370/236 |
| 2004/0039833 A1* | 2/2004 | Ludwig et al. | 709/230 |
| 2004/0082339 A1* | 4/2004 | Lee | 455/453 |
| 2004/0230695 A1* | 11/2004 | Anschutz et al. | 709/232 |
| 2004/0246937 A1* | 12/2004 | Duong et al. | 370/345 |
| 2005/0216822 A1* | 9/2005 | Kyusojin et al. | 715/501.1 |
| 2005/0276249 A1* | 12/2005 | Damnjanovic et al. | 370/335 |
| 2006/0133326 A1 | 6/2006 | Kawakami | |
| 2006/0209882 A1* | 9/2006 | Han et al. | 370/465 |
| 2007/0217349 A1* | 9/2007 | Fodor et al. | 370/310.2 |
| 2008/0076432 A1* | 3/2008 | Senarath et al. | 455/442 |

OTHER PUBLICATIONS

International Search Report and Written Opinion—PCT/US2006/032404, International Search Authority—European Patent Office—Dec. 27, 2006.

Polyzos G C et al: "Enhancing Wireless Internet Links for Multimedia Services" Proceedings of the MOMUC, Oct. 1998 (1998-Io), pp. 379-384, XP002273077.

Parag Agashe Et. Al, RLP Naks and Timeout, C20-20030414-110 (Qualcomm_RLPDosableNak), Apr. 14, 2003, full text, URL, htpp://ftp.3gpp2.org/TSGC/Working/2003/2003-04-Coeur-d'Alene/TSG-C-2003-04-Coeur-d'Alene/WG2/C20-20030414-110(Qualcomm-RLPDisableNak).pdf.

\* cited by examiner

PRIORITIZATION TECHNIQUES FOR QUALITY OF SERVICE PACKET TRANSMISSION OVER A NETWORK LACKING QUALITY OF SERVICE SUPPORT AT THE MEDIA ACCESS CONTROL LAYER

TECHNICAL FIELD

The disclosure relates to wireless communication and, more particularly, wireless packet transmission in compliance with a first generation (1X) evolution data optimized (EV-DO) network or a similar network that does not inherently support quality of service (QoS) at the media access control (MAC) level.

BACKGROUND

In a wireless communication network, base stations typically provide network access to mobile devices (sometimes referred to as subscriber units). A mobile device generally refers to any wireless device used by an end user, such as a mobile radiotelephone or similar device. Mobile devices communicate with base stations over the communication network in order to communicate with other devices through the base stations. Base stations are generally stationary equipment that wirelessly communicate with the mobile devices to provide the mobile devices with access to a wired telecommunication network. For example, the base stations may provide an interface between the mobile devices and a public switched telephone network (PSTN) such that telephone calls can be routed to and from the mobile devices. Additionally, the base stations may be coupled to a packet-based network for transmission of packet-based voice information or packet-based data.

A number of different wireless communication techniques have been developed for communication between mobile devices and base stations. Examples include frequency division multiple access (FDMA) techniques, time division multiple access (TDMA) techniques and various spread spectrum techniques. A number of wireless communication standards have been developed using these and other techniques. One very common spread spectrum technique used in wireless communication is code division multiple access (CDMA) signal modulation in which multiple communications are simultaneously transmitted over a spread spectrum radio-frequency (RF) signal. CDMA utilizes orthogonal codes to generate spread spectrum signals that can be simultaneously transmitted by several sending devices on the network, and extracted by receiving devices using the respective codes.

In order to support and improve packet communication between mobile devices and base stations, many packet communication techniques have been developed to operate in parallel with telecommunication techniques, such as CDMA. One example of a communication network used for packet communication between mobile devices and base stations is the evolution data optimized (EV-DO) network. EV-DO networking techniques are commonly used in mobile networks that support CDMA or other spread spectrum communication techniques in order to allow for packet communication of data packets or voice-over-Internet-Protocol (VoIP) packets. Unfortunately, the first generation (1X) EV-DO network does not provide for quality of service (QoS) in packet transmissions in the physical media access control (MAC) layer. The first generation (1X) EV-DO network is also commonly referred to as "Release 0." The second generation EV-DO network is commonly referred to as "Release A."

QoS generally refers to the prioritization of certain packets over other packets in order to better ensure timely transmission of time-sensitive packets, such as VoIP packets or real-time video packets. QoS techniques are common in many networks, but as indicated, are not supported in the MAC layer of the 1X EV-DO network. Other data networking techniques used for packet communication between mobile devices and base stations may have similar limitations, particularly at the hardware level. While future generations of such networks may provide QoS support at the MAC level, implementation of such future generation networks can require hardware updates in the base stations, which can be very costly for network service providers.

SUMMARY

In general, this disclosure is directed to packet scheduling techniques for prioritizing packets in a first generation (1X) evolution data optimized (EV-DO) network or similar networks that do not provide quality of service (QoS) support at the media access control (MAC) level. The techniques may be executed in mobile devices that communicate packets to the base stations of the network. The techniques ensure compliance with the 1X EV-DO network or similar network, and achieve QoS without requiring MAC level updates in the base stations.

More specifically, the techniques make use of a plurality of prioritized queues that are organized into packet flows such that each of the packet flows includes one or more of the prioritized queues. At least one of the packet flows include a plurality of the prioritized queues. Typically, a plurality or possibly all of the packet flows include a plurality of queues. In any case, the different packet flows associate packets having similar or identical radio link protocols (RLPs) in order to achieve the necessary error detection for such related packets. The different queues are prioritized, in order to give transmission priority to certain types of packets over other types of packets. By separating the packets into different prioritized queues and associating several queues into common packet flows, prioritization can be achieved along with an efficient implementation of different error detection schemes. A number of additional scheduling rules and techniques are also described which can ensure effective implementation of QoS, while maintaining compliance with the 1X EV-DO network or a similar network.

In one embodiment, this disclosure is directed to a device that provides QoS for wireless packet transmission between the device and a base station in a communication network. The device comprises a classifier unit that receives packet to be transmitted and separates the packets into a plurality of prioritized queues based on packet type, wherein the prioritized queues are organized into packet flows such that each of the packet flows includes one or more of the prioritized queues and at least one of the packet flows include a plurality of the prioritized queues. The device also comprises a scheduler unit that schedules packet transmissions based on prioritization numbers of the prioritized queues and the packet flows associated with the prioritized queues.

In another embodiment, this disclosure describes a method of providing QoS for wireless packet transmission between a device and a base station in a communication network. The method comprises receiving packets to be transmitted, separating the packets into a plurality of prioritized queues based on packet type, wherein the prioritized queues are organized into packet flows such that each of the packet flows includes one or more of the prioritized queues and at least one of the packet flows include a plurality of the prioritized queues, and scheduling packet transmissions based on prioritization numbers of the prioritized queues and the packet flows associated with the prioritized queues.

These and other techniques described herein may be implemented in a mobile device in hardware, software, firmware, or any combination thereof. If implemented in software, the software may be executed in a processor such as a digital signal processor (DSP). In that case, the software that executes the techniques may be initially stored in a computer readable medium and loaded and executed in the DSP in order to provide QoS for wireless packet transmission between a device and a base station in a communication network.

Accordingly, in another embodiment, this disclosure describes a computer readable medium comprising computer readable instructions that when executed in a device of a wireless communication network cause the device to provide QoS for wireless packet transmission between the device and a base station in the communication network. Upon execution, the instructions cause the device to separate received packets into a plurality of prioritized queues based on packet type, wherein the prioritized queues are organized into packet flows such that each of the packet flows includes one or more of the prioritized queues and at least one of the packet flows include a plurality of the prioritized queues, and schedule packet transmissions based on prioritization numbers of the prioritized queues and the packet flows associated with the prioritized queues.

The details of one or more embodiments of this disclosure are set forth in the accompanying drawings and the description below. Other features, objects, and advantages of this disclosure will be apparent from the description and drawings, and from the claims.

DETAILED DESCRIPTION

This disclosure is directed to packet scheduling techniques for prioritizing packets in order to achieve quality of service (QoS). QoS generally refers to the prioritization of certain packets over other packets in order to better ensure timely transmission of time-sensitive packets, such as (VoIP) packets or real-time video packets. However, QoS can generally be used to prioritize packets for any reason. QoS techniques are common in many networks, but are not supported in the media access control (MAC) layer of the first generation (1X) evolution data optimized (EV-DO) network. This disclosure describes techniques that allow for efficient implementation of QoS in the 1X EV-DO network or similar networks.

The techniques may be executed in mobile devices that communicate packets to the base stations of the network. More specifically, the techniques make use of a plurality of prioritized queues that are organized into packet flows such that each of the packet flows includes one or more of the prioritized queues. At least one of the packet flows include a plurality of the prioritized queues. Typically, a plurality or possibly all of the packet flows include a plurality of queues. In any case, different packet flows associate packets having similar or identical radio link protocols (RLPs) in order to achieve the necessary error detection and packet loss schemes for such packets having similar RLPs. In addition, the different queues define packet priorities base on packet type, in order to give transmission priority to certain types of packets over other types of packets.

By separating the packets into different prioritized queues and associating several queues into common packet flows, prioritization can be achieved along with an efficient implementation of different error detection and packet loss schemes. In particular, by associating different prioritized queues into packet flows based on the RLPs of the packets in the queues, error detection and packet loss schemes can be defined on a packet flow basis. In this manner, the described techniques may be more efficient than other QoS techniques that might be used in such networks. A number of additional scheduling rules and techniques are also described which can ensure effective implementation of QoS, while maintaining compliance with the 1X EV-DO network or a similar network.

Figure 1:
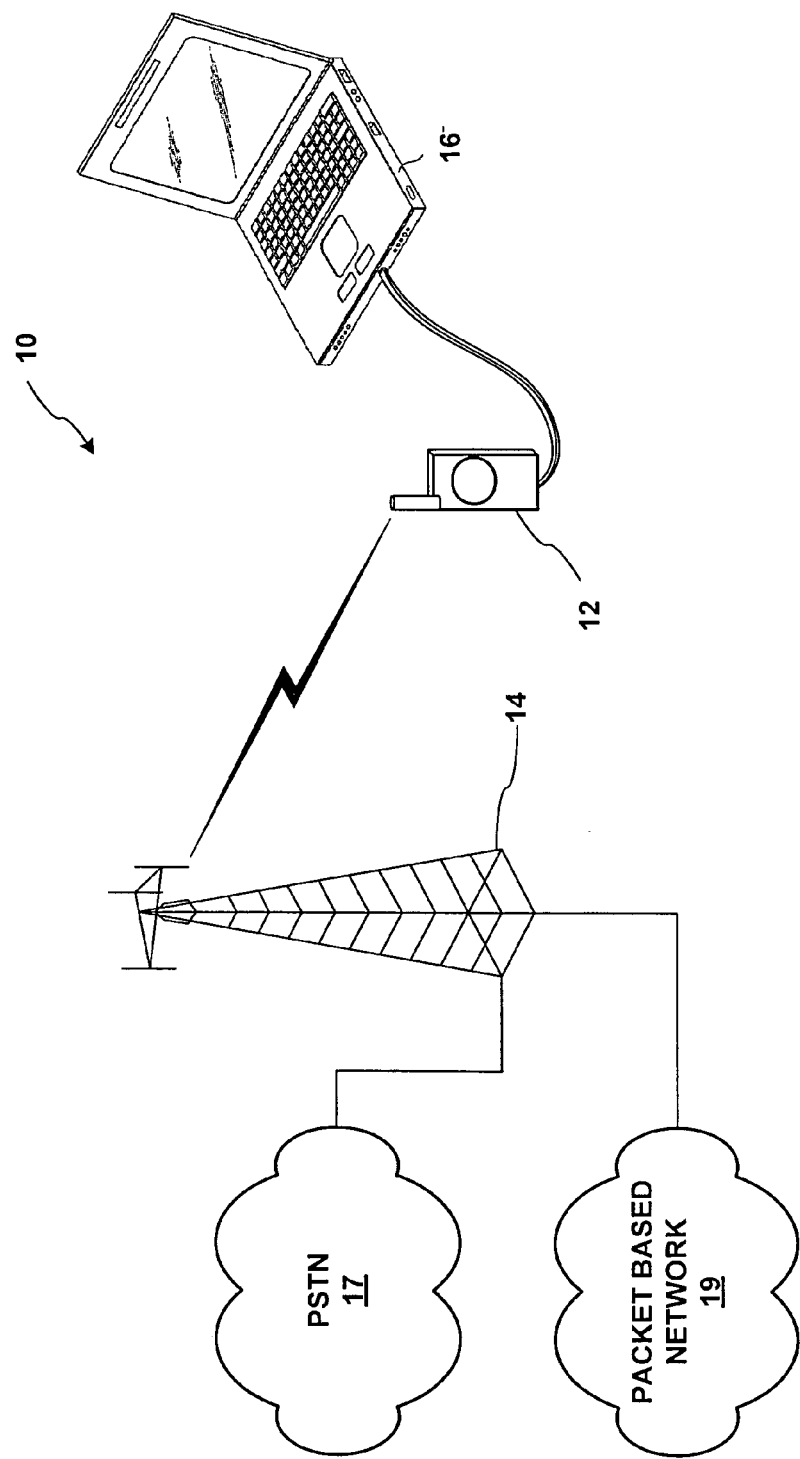
FIG. 1 is a system diagram of a wireless communication system capable of implementing one or more aspects of this disclosure.

FIG. 1 is a system diagram of a wireless communication system 10, including a mobile device 12 that communicates with a base station 14. Mobile device 12 generally refers to any wireless device used by an end user. Examples of mobile device 12 include a mobile radiotelephone, a personal digital assistant (PDA), a portable computer, a portable interactive television, a wireless data terminal, a wireless data collection device, or any other mobile device that sends packets according to a network protocol that does not support QoS at the MAC level, such as the 1X EV-DO network protocol.

Base station 14 is stationary equipment that wirelessly communicates with mobile device 12 to provide the mobile devices with access to a wired telecommunication network. For example, base station 14 may provide an interface between the mobile device 12 and a public switched telephone network (PSTN) 17 such that telephone calls can be routed to and from the mobile devices. Additionally, base station 14 may be coupled to a packet-based network 19 for transmission of packet-based voice information or packet-based data. Base station 14 may also be referred to as a base transceiver systems (BTS).

In the example of FIG. 1, mobile device 12 is illustrated as being coupled to a laptop computer 16 in order to provide packet based telecommunication service to laptop computer 16. The techniques described herein are very useful for such arrangements, in which case mobile device 12 may allow for phone service to a user and simultaneous packet-based data service to laptop computer 16. The techniques, however, are not limited to use with an attached laptop computer 16 and may be used to provide both packet-based telecommunication and non-packet based telecommunication to mobile device 12 to support applications executed by mobile device 12 without an attached laptop computer 16.

Mobile device 12 may support at least two telecommunication protocols. In particular, mobile device 12 may support a first wireless communication protocol for communicating voice data, and a second communication protocol for communicating packets. The first communication protocol may comprise code division multiple access (CDMA), although many other techniques could alternatively be used. The second communication protocol may comprise EV-DO networking techniques that are often used in mobile networks that support CDMA. As mentioned, however, the 1X EV-DO network does not provide for QoS in packet transmissions in the physical MAC layer. This disclosure addresses this limitation by providing techniques that can facilitate such QoS in mobile device 12 in an effective manner.

Figure 2:
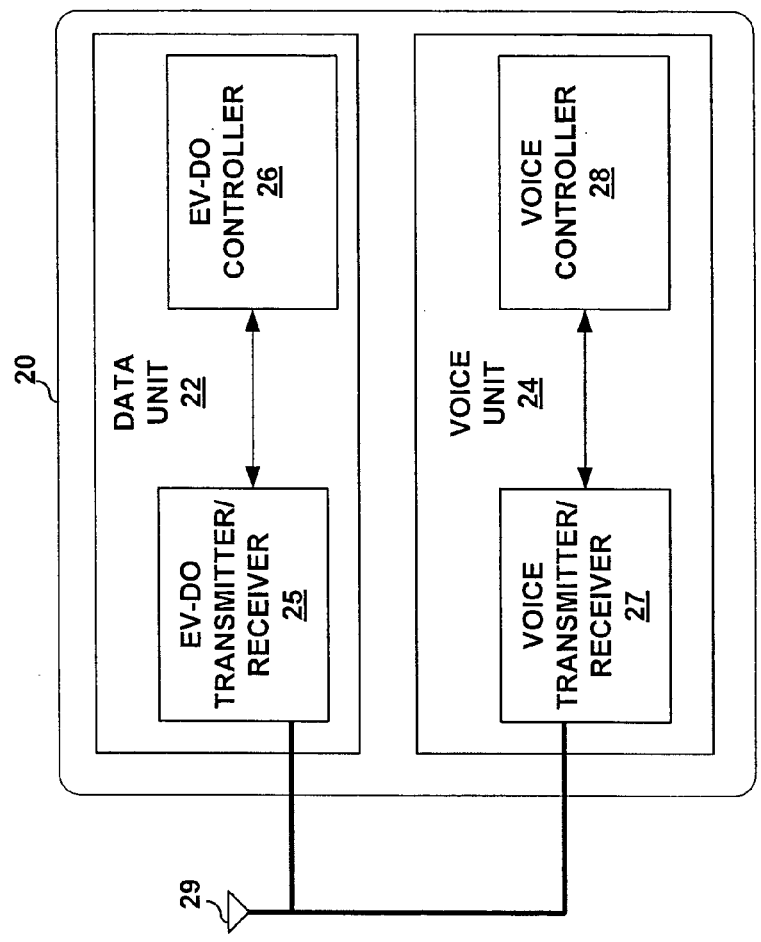
FIG. 2 is a block diagram of a mobile device according to an exemplary embodiment of this disclosure.

FIG. 2 is a block diagram of an exemplary mobile device 20, which may correspond to device 12 of FIG. 1. As shown in FIG. 2, mobile device 20 includes a data unit 22 and a voice unit 24. Data unit 22 facilitates packet-based communication, whereas voice unit 24 facilitates non-packet based communication. Data unit 22 and voice unit 24 may share a common antenna 29, or two or more separate antennas may be used.

Voice unit 24 may facilitate telecommunication according to CDMA communication techniques. CDMA is a very common spread spectrum technique used in wireless communication in which multiple communications are simultaneously transmitted over a spread spectrum radio-frequency (RF) signal. In order to support CDMA, voice controller 28 utilizes orthogonal codes to generate a spread spectrum signal, which is transmitted by voice transmitter/receiver 27. CDMA techniques allow for the simultaneous transmission of signals by several sending devices on the network, and extraction of the various signals by receiving devices using the respective codes. Voice controller 28 and voice transmitter/receiver 27 may generally conform to a conventional CDMA architecture to facilitate such communication.

Data unit 22 supports packet communication between mobile device 20 and one or more base stations according to the EV-DO protocol. EV-DO networking techniques are commonly used in mobile networks that support CDMA or other spread spectrum communication techniques in order to allow for packet communication of data packets or VoIP packets. Data unit 22 may include an EV-DO controller 26 and an EV-DO transmitter/receiver 25 to facilitate such packet communication. As described in greater detail below, EV-DO controller 26 may implement packet scheduling techniques for prioritizing packets in order to achieve QoS.

Again, the 1X EV-DO network does not provide QoS in packet transmissions in the physical MAC layer. This generally means that base station hardware designed for 1X EV-DO network communication does not support QoS. In accordance with this disclosure, however, EV-DO controller 26 provides QoS without requiring MAC layer updates to the base stations.

EV-DO controller 26 includes a plurality of prioritized queues that are organized into packet flows such that each of the packet flows includes one or more of the prioritized queues. At least one of the packet flows include a plurality of the prioritized queues. The different packet flows associate packets having similar RLPs in order to achieve the necessary error detection and packet loss schemes for such packets having similar RLPs. In addition, the different queues define packet priorities based on packet type, in order to give transmission priority to certain types of packets over other types of packets.

Figure 3:
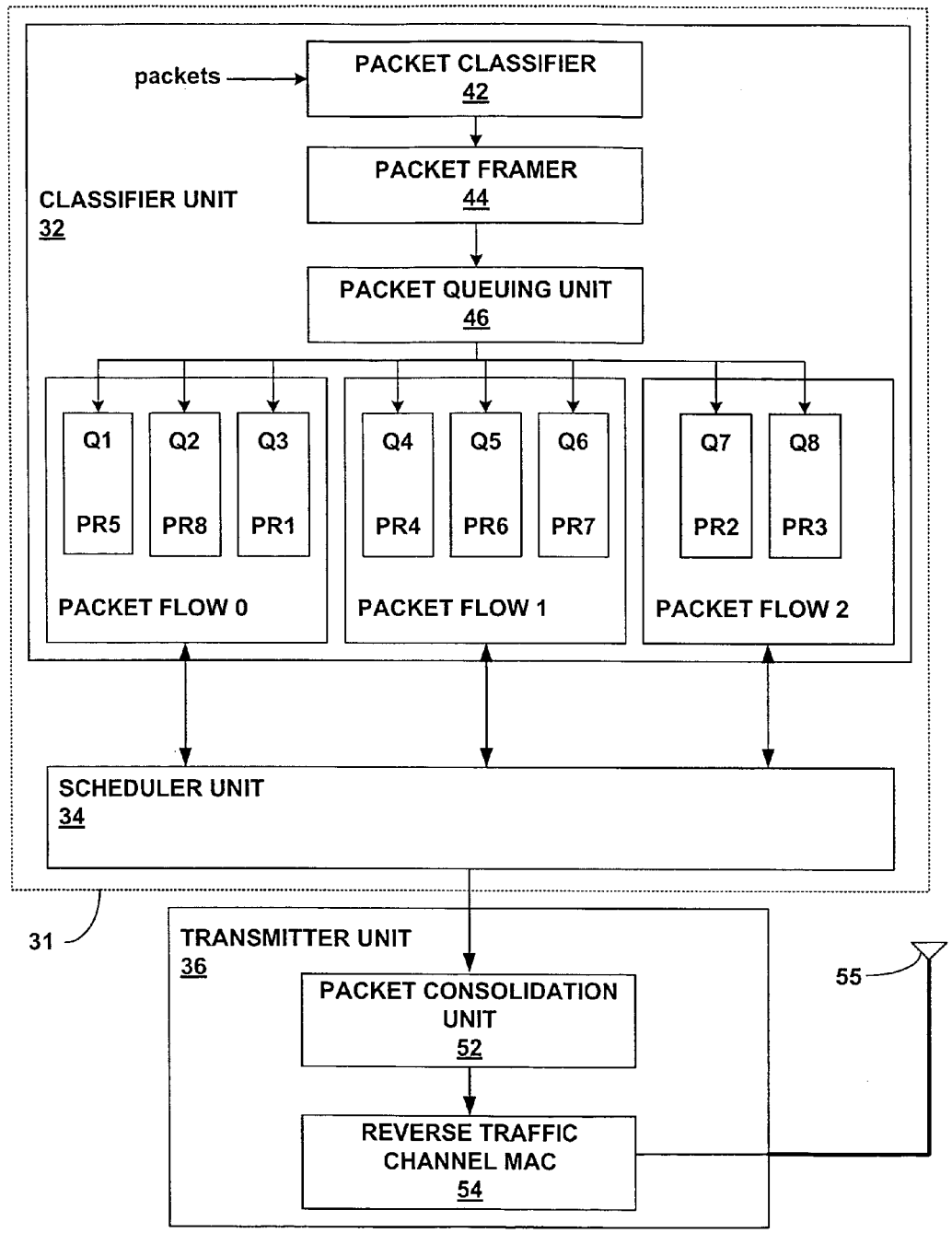
FIG. 3 is a more detailed exemplary block diagram of various components of a mobile device according to this disclosure.

FIG. 3 is a depiction of a packet-based telecommunication control unit 31 and a transmitter unit 36. Control unit 31 may correspond to EV-DO controller 26 (FIG. 2) and transmitter unit 36 may correspond to EV-DO transmitter/receiver 25 (FIG. 2). As shown in FIG. 3, control unit 31 includes a classifier unit 32 and a scheduler unit 34.

Classifier unit 32 receives packets to be transmitted and separates the packets into a plurality of prioritized queues (Q1-Q8) based on packet type. For example, classifier unit 32 may include a packet classifier 42, a packet framer 44, a packet queuing unit 46, a plurality of packet flow units (labeled packet flow 0, packet flow 1, and packet flow 2). The prioritized queues (Q1-Q8) are labeled with priority numbers ranging from priority 1 (PR 1) to priority 8 (PR 8). Of course, more queues or fewer queues could be used. The prioritized queues (Q1-Q8) are organized into the packet flows such that each of the packet flows includes one or more of the prioritized queues.

In this disclosure, the term packet flow refers to a flow of packets according to a common or substantially similar RLP. In other words, packets having common or similar RLPs are associated into common flows, even if the priorities of such packets are different. Thus, all of the queues that correspond to a common packet flow include packets to be sent according to a common or substantially similar RLP. Generally, at least one of the packet flows include a plurality of the prioritized queues. In the example of FIG. 3, packet flow 0 includes three queues, packet flow 1 includes three queues and packet flow 2 includes two queues. As described in greater detail below, scheduler unit 34 is used to schedule packet transmissions based on prioritization numbers of the prioritized queues and the packet flows associated with the prioritized queues.

The input to packet classifier 42 may be a stream of Internet Protocol (IP) packets to be transmitted (labeled "packets" in FIG. 3) by mobile device 12 (FIG. 1). Packet classifier 42 parses these packets and classifies them according to predetermined classification criteria. Packet classifier 42 tags the packets according to the priority associated with this classification criteria. In this manner, packet classifier 42 of classifier unit 32 classifies the packets into different packet types that can be analyzed for QoS determinations. For example, packets associated with real-time audio or real-time video transmissions may be tagged with a higher priority than packets associated with non-real time file transfers. In addition to tagging packets with priority, packet classifier 42 also tags the packets with the respective RLP associated with each of the packets.

In one example, the input labeled "packets" in FIG. 3 is serial IP traffic that needs to be transmitted over the 1X EV-DO network. Different packets may be generated by different applications running on mobile device 12 (FIG. 1), but interleaved with one another in the common serial packet stream. Though this IP traffic is inputted serially, certain IP packets may have higher priority than other packets and may need to be transmitted before the other packets in order to insure timely arrival. In this case, the IP packets can be classified based on some predetermined criteria (such as the destination IP address, the port associated with the packet, or whether the packet is a transmission control protocol (TCP) packet, a user datagram protocol (UDP) packet or internet control message protocol (ICMP) packet, or some other packet type. In accordance with this disclosure, packet classifier 42 determines the packet types and tags the packets for transmission over a particular RLP. Scheduler 34 can then use the tags for such packet scheduling.

Table 1 provides one example of parameters that may be used in classification of IP packets and how they are associated with a priority and a particular RLP.

TABLE 1

| Reservation Label | Relative Priority | Protocol | IP address range | | IP port range | | RLP Flow |
|---|---|---|---|---|---|---|---|
| | | | Start Address | End Address | Start Port Number | End Port Number | |
| 0-255 | 0-255 | TCP/ UDP/ ICMP | a.b.c.d | e.f.g.h | xxxx | yyyy | 0, 1, 2 |

In Table 1, the Reservation Label is the label associated with the particular QoS criterion. The QoS criterion includes the packet flow specifications as well as the packet filtering specifications. For example, the packet filter specifications could be defined by:

1. Protocol: Whether the packet is UDP, TCP, ICMP or other.
2. Destination IP address range: Start IP address and End IP address.
3. Destination Port number range: Start Port number and End Port number.

The Relative Priority ranks the packets by priority. The RLP Flow is the RLP associated with the particular IP Flow. A wide variety of packet classifying schemes or priority schemes could be defined using the variables of Table 1 or other variables associated with the packets.

Once the packets have been classified, packet framer 44 frames the packets, e.g., according to hop-to-hop link protocol such as a point-to-point (PPP) protocol. In particular, packet framer 44 encapsulates the packets according to the PPP protocol and forwards the encapsulated packets to packet queuing unit 46. Packet queuing unit 46 separates the packets into queues (Q1-Q8) based on the priority tag associated with each respective packet. For example, there may be one priority level assigned for each respective queue (priority levels being labeled PR1-PR8). Packets belonging to different classification criteria, but having the same priority, will be placed in the same queue such that these packets will be serviced in a "first come-first serve" basis within that respective queue.

For example, packet queuing unit 46 of classifier unit 32 may separate packets into the plurality of prioritized queues (Q1-Q8) by separating voice packets into one or more of the prioritized queues (such as Q3) and separating data packets into one or more of the prioritized queues (such as Q4). In this example, the queue Q3 has a priority of PR1, whereas queue Q4 has a priority of PR 4, which means the voice packets will generally be given higher scheduling priority than the data packets.

In another example, packet queuing unit 46 of classifier unit 32 may separate packets into the plurality of prioritized queues (Q1-Q8) by separating video packets into one or more of the prioritized queues (such as Q7) and separating data packets into one or more of the prioritized queues (such as Q4). In this example, the queue Q7 has a priority of PR2, whereas queue Q4 has a priority of PR 4, which means the video packets will generally be given higher scheduling priority than the data packets.

At the same time, each of the packet flows (packet flow 0, packet flow 1 and packet flow 2) may include queues for packets that have the same or substantially similar radio link protocols (RLPs). Accordingly, each of the packet flows may define a different error detection scheme relative to other packet flows. Moreover, each of the packet flows defines a different packet loss scheme relative to others of the packet flows. Thus, for each of the packet flows, the packets within different priority queues (such as queues Q1, Q2 and Q3 within packet flow 0) may use common or substantially similar packet loss schemes or error detection schemes according to the same or substantially similar RLPs. In some cases, Q1-Q3 of packet flow 0 may include packets to be transmitted according to a first RLP, Q4-Q6 of packet flow 1 may include packets to be transmitted according to a second RLP, and Q7-Q8 of packet flow 2 may include packets to be transmitted according to a third RLP.

With the different priority queues organized according to packet flows that define the same or similar RLPs, each packet can be serviced according to its tagged RLP in a very efficient manner. Scheduler 34 can determine which packets in which respective queues should be scheduled for transmission based on priority and packet flows. In particular, once the packets are sorted into the different queues, which are organized into the different packet flows, scheduler 34 can utilize one or more of the techniques described in greater detail below to determine which packets should be transmitted. In this manner, scheduler 34 can schedule such packet transmissions in an efficient and effective manner.

For example, scheduler unit 34 may perform a number of functions in order to achieve desirable packet scheduling that achieves QoS. When asked by packet consolidation unit 52 for data to be transmitted, scheduler unit 34 may determine which multi-link radio link protocol (MRLP) packets should be transmitted and schedules them for transmission.

There are various algorithms that scheduler unit 34 can use to schedule packet transmission. One such algorithm is a "highest priority first" algorithm. According to this technique, as long a higher priority queue has packets for transmission, scheduler unit 34 will schedule packets from this queue. Only when a higher priority queue has no more packets will scheduler unit 34 schedule packets from a lower priority queue.

However, before scheduling new packets for transmission, the scheduler unit 34 needs to make sure that there are no re-transmissions pending on any RLP. Thus, before scheduling an IP packet for transmission, scheduler unit 34 can make sure each MRLP transmits any pending retransmit packets. Retransmit packets are generally packets for which the receive device has requested a re-send. According to this technique, when the device receives a message to re-transmit one or more packets, scheduling unit 34 may schedule such re-transmissions prior to any first transmissions, regardless of priority. There maybe some relative scheduling requirements that generally need a new IP packet on a particular RLP before retransmission of a packet on a different RLP. However, in one relatively simple implementation, any retransmit packet on any RLP takes first priority over new packets. For retransmit packets, packets on packet Flow 0 are transmitted first, then on packet flow 1, then on packet flow 2, etc. Variations, however, could be made to this algorithm for transmitting packets from packet flows having the highest priority first, assuming packet flow 0 is given highest priority of the packet flows.

After transmitting all retransmit packets, scheduler unit 34 polls the appropriate queues for new data according to the relative priority of the queues. In determining which queue to transmit packets from, scheduler unit 34 also determines the packet flow associated with the queue and schedules the RLP for packet transmission accordingly.

After transmitting all new data from the queues, scheduler unit 34 can check if the so called "flush time" on any of the RLPs has expired, and if so, scheduler unit 34 can schedule that RLP to retransmit the last octet that it sent. The flush time is generally a time frame that ensures that the last byte will be resent if no traffic has been sent for the flush time. This allows the receive device to identify whether packets were lost, and allows the receive device to request a resend of such packets, if necessary. In short, after transmitting all of the packets in the packet flows, scheduling unit 34 may determine if a flush time associated with any of the packet flows has expired and if so, schedules transmission of a last transmitted octet associated with one or more packet flows having the expired flush time.

Scheduler unit 34 also needs to be aware of PPP packet boundaries. For example, if two queues (say Q1 and Q2) are defined in the same packet flow that define the same RLP, then if the RLP is transmitting a packet from Q1, it generally cannot transmit a packet from Q2 until the entire PPP packet of Q1 has been transmitted. In general, scheduling unit 34 schedules packet transmissions for packets in a higher priority queue when packets are not currently being transmitted from the one of the packet flows associated with the higher priority queue and schedules packet transmissions for packets in a lower priority queue when packets are currently being transmitted from the one of the packet flows associated with the higher priority queue, wherein the lower priority queue is associated with a different one of the packet flows than the higher priority queue.

Another issue that scheduler unit 34 may need to address is that of signaling messages. For example, packet consolidation unit 52 may poll scheduler unit 34 for RLP signaling messages. In this case, scheduler unit 34 will go through all the packet flows to see if there are any signaling messages to be transmitted and will transmit them accordingly. Again, in one relatively simple example, packet flow 0 is considered the highest priority flow. Thus, using the "highest priority first" algorithm, signaling messages can be sent for packet flow 0, then packet flow 1, then packet flow 2. Sending of signaling messages takes place on a signaling stream or control channel. In this manner, packet consolidation unit 52 can ensure that the signaling messages are transmitted before any non-control packets. Thus, at the direction of packet consolidation unit 52, scheduling unit 34 schedules transmission of signaling message packets prior to scheduling transmission of any other packets.

Put another way, all signaling messages generally will be given priority over all data, voice, video or any non-signaling message packets. Packet consolidation unit 52 ensures that such signaling messages are sent before any attempts to send other packets. When asked by packet consolidation unit 52 to build signaling messages, scheduler unit 34 builds such messages for each packet flow. Signaling messages for Packet Flow 0 will get sent before signaling messages for Packet Flow 1, etc.

The following pseudo-code provides one example of a program that scheduling unit 34 may use to schedule transmission of signaling message packets prior to scheduling transmission of any other packets. In this example, the packet flows, e.g., shown in FIG. 3, are represented by the variable rlp_flow(i). Thus, each packet flow is also an RLP flow in this example.

```
hdrrlptxsched_queue_msg ( )
{
    for(i=0; i < Max Active RLP; i++ )
```

-continued

```
    {
        if( rlp_flow[i] has sig msgs to send )
        {
            Form message;
            Queue message to SLP by calling hdrslp_queue_msg( )
        }
    }
}
```

In this example code, labeled hdrrlptxsched_queue_msg, each RLP flow is examined to determine if it has signaling messages. If so, the signaling messages are formed without regard to any other packet priority. SLP stands for "Session Layer Protocol" and generally represents software that facilitates over the air transport. The function hdrslp_queue_msg is a function used by a data services layer to request an SLP Layer to transport the message over the air.

Scheduler unit 34 can maintain one or more tables that identify the priority of the different queues along with the packet flows to which the different queues belong. Such tables can allow scheduler unit 34 to loop through the queues according to their priority to see if they have data to transmit, and then determine their associated packet flow very quickly. In addition, scheduler unit 34 can maintain one or more Tables to determine which queue a given packet flow is currently serving in order to allow packet boundaries to be maintained and ensure that two queues in the same packet flow are not scheduled for packet transmission in a manner that could compromise packet boundaries.

For any given packet flow transmission, an RLP sequence number may be padded to a stream of bytes. Any time the RLP sequence number is padded to a stream of bytes, packet consolidation unit 52 can also append a stream header to this stream of bytes. In this manner, according to the pseudo-code below, the scheduler function always returns after getting any data from an RLP. If the function did not return, then it would need to perform an additional process of appending the appropriate stream header and chaining of packets from different RLPs, both of which are already taken by packet consolidation unit 52. As long as packet consolidation unit 52 can send more bytes in the given frame, it will keep calling this function, until the function returns no bytes.

The following pseudo-code outlines one implementation of techniques that can be performed by scheduler unit 34. The pseudo-code refers to "RLP flows" in the sense that packet flows, as outlined above, are assumed to include packets having the same RLPs. The pseudo-code below includes comments preceding the actions defined by the code, which explains the functionality of the steps that are executed.

```
/* rev_pkt_ptr is a pointer to the place where to chain the dsm bytes.
   max bytes is the max that can be transmitted */
int hdrlptxsched_get_pkt_cb( rev_pkt_ptr, max_bytes )
{
    /* Go thru all the RLP Flows and Transmit any retransmit packets.
       RLPFlow[i] is higher priority than RLPFlow[i+1] */
    for( i=0; i < Max RLP Flows; i++ )
    {
```

```
            if(RLPFlow[i] has retransmit data)
            {
                return hdrmrlp_form_retx_data( rev_pkt_ptr, max_bytes );
            }
        }
        /* Now Go through all the priority queues and schedule packets
for
            transmission based on the higher priority queue having new
            packets to transmit. If this priority queue uses a RLP that
            is already in the midst of transmitting a partial PPP packet
            from another priority queue, then the queue cannot be
            scheduled for
            transmission, and the techniques look for the next highest
            priority queue
        */
        for( i=0; i< # of priority queues; i++ )
        {
            /* Set the queue_handle =
                    highest_priority_queue_with_new_data_to_transmit
            */
            if( pri_queue[i] is empty )
            {
                continue;
            }
            else
            {
                chosen_rlp = pri_queue[i].rlp_handle;
            }
            /* Schedule RLP only if the chose_rlp is not transmitting
any
                partial PPP data, or it is transmitting partial PPP data
                from the same priority_queue */
            if(( chosen_rlp->handle_to_pri_queue_for_partial_ppp == NULL
) ||
                ( chosen_rlp->handle_to_pri_queue_for_partial_ppp ==
pri_queue[i] ))
            {
                bytes_built =
                    hdrmrlp_get_pkt( chosen_rlp, pri_queue[i], max_bytes
);
                if( rlp_handle did not tx complete ppp packet )
                {
                    //set flag RLP is transmitting from pri_queue[i]
                    chosen_rlp->handle_to_pri_queue_for_partial_ppp =
pri_queue[i];
                }
                else
                {
                    //finishedtxing complete PPP
                    chosen_rlp->handle_to_pri_queue_for_partial_ppp = NULL;
                }
                return bytes_built;
            }
        }
        /* Now go through all the RLPs so see if the flush timer has
        expired on any of the RLPs. If yes, then schedule the last
        octet for transmission */
        for( i=0 ; i<Max RLP Flows; i++ )
        {
            if( RLPFlow[i] flush timer expired )
            {
                return hdrmrlp_build_last_octet( rlp_handle[i], max_bytes
);
            }
        }
    }
```

Once scheduler 34 has scheduled packet transmissions as outlined above, transmitter unit 36 transmits such packets according to the scheduling. In particular, transmitter unit 36 may include a packet consolidation unit 52 to consolidate packets and a reverse traffic channel MAC 54 that physically sends the packets over the air via antenna 55. As outlined above, packet consolidation unit 52 may periodically communicate with scheduler 34 in a manner that can affect the packet scheduling, such as by polling scheduler unit 34 for RLP signaling messages, in which case scheduling unit 34 schedules transmission of the signaling message packets prior to scheduling transmission of any other packets.

Figure 4:
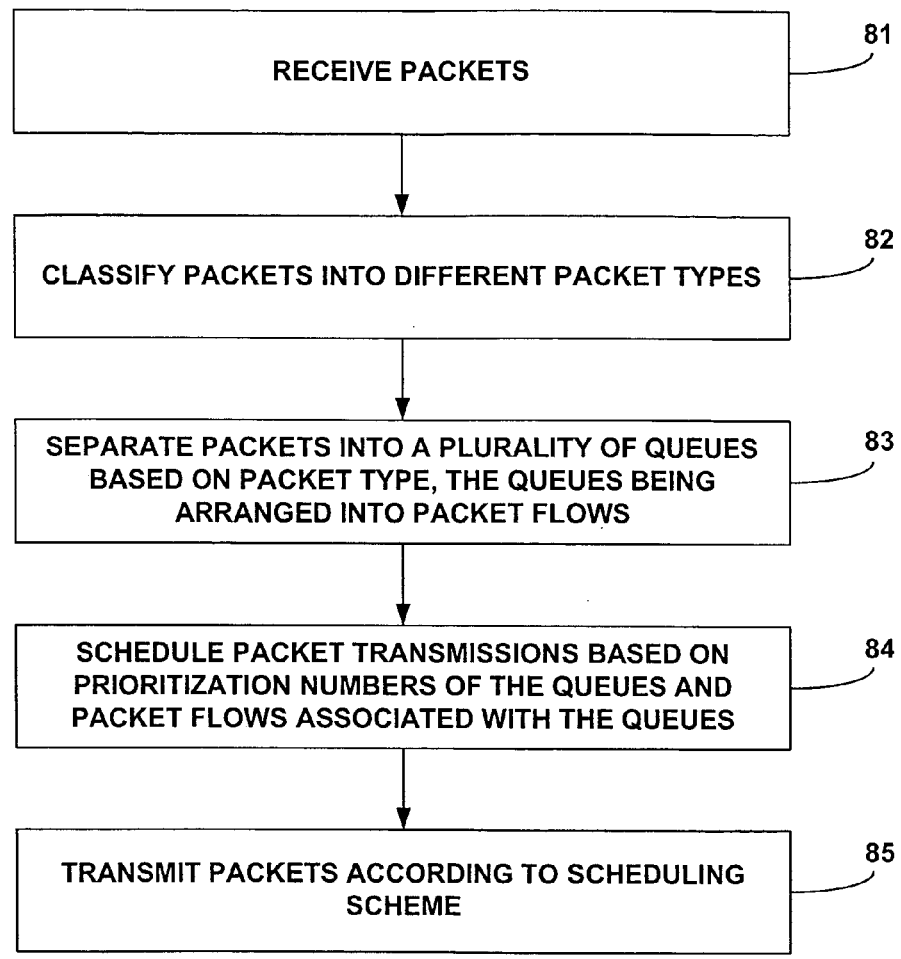
FIG. 4 is a flow diagram illustrating exemplary operation of a mobile device according to an embodiment of this disclosure.

FIG. 4 is a flow diagram illustrating a technique that can be implemented by control unit 31 or a similar control unit of a telecommunication device. As shown in FIG. 4, packet classifier 42 receives packets (81) and classifies the packets into different packet types (82). For example, packet classifier 42 may tag the packets with IP tags indicating the priority and RLP tags indicating the RLP associated with the packet. Packet queuing unit 46 can then separate the packets into a plurality of queues (Q1-Q8), which are arranged into packet flows (packet flow 0, packet flow 1 and packet flow 2) (83). Prior to such queuing, the packets may be framed by packet framer 44. The packet flows (0, 1 and 2) associate packets having similar or identical RLPs even if such packets reside in different queues. In other words, the queues of any common packet flow may include packets that have similar or identical RLPs.

Scheduler unit 34 schedules packet transmissions based on prioritization numbers of the queues and packet flows associated with the queues (84). For example, scheduler unit 34 may schedule packets in a higher priority queue when packets are not currently being transmitted from the packet flow associated with the higher priority queue, but schedule packets in a lower priority queue (associated with a different packet flow) when packets are currently being transmitted from the packet flow associated with the higher priority queue. A number of additional scheduling rules are outlined above, which may also be implemented, such as a rule that causes signaling of message packets prior to scheduling transmission of any other packets regardless of priority. In any case, once packets are scheduled, transmitter unit 36 transmits such packets according to the scheduling scheme (85).

Various embodiments of the application have been described. In particular, packet scheduling techniques for prioritizing packets have been described for use in the 1X EV-DO network or similar networks that do not provide QoS support at the MAC level. The techniques may be used for scheduling PPP packets based on IP priority in a 1X EV-DO network using multi-flow packet application RLP and subtype 0 reverse traffic channel MAC. In such an application, there are multiple RLP flows, and a particular PPP packet can be associated with a particular RLP flow based on the IP packet it encapsulates.

The techniques described herein may be implemented in a mobile unit in hardware, software, firmware, or the like. Example hardware implementations include implementations within a digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store or otherwise comprise computer readable instructions, i.e., program code, that can be executed by a processor or DSP of a subscriber unit or base station to carry out one or more of the techniques described above.

For example, the computer readable medium may comprise random access memory (RAM), read-only memory (ROM), non-volatile random access memory (NVRAM), electrically erasable programmable read-only memory (EEPROM), flash memory, or the like. The computer readable medium can form part of a mobile unit 12 that includes a processor or DSP that executes various software modules stored in the computer readable medium.

Numerous other modifications may be made without departing from the spirit and scope of this disclosure. For example, although many of the techniques have been described in the context of 1X EV-DO, the techniques may also be useful for other network protocols that do not inherently support QoS at the MAC level. These and other embodiments are within the scope of the following claims.

The invention claimed is:

1. A device that provides quality of service (QoS) for wireless packet transmission between the device and a base station in a communication network lacking QoS support at a Media Access Control (MAC) layer, the device comprising:
   a packet classifier unit that receives packets to be transmitted and tags each received packet with a priority tag indicating a priority of the received packet and a Radio Link Protocol (RLP) tag indicating an RLP associated with the received packet;
   a packet queuing unit that separates the received packets into a plurality of prioritized queues based on the priority tag of each received packet, wherein the prioritized queues are organized into a plurality of packet flows such that each of the plurality of packet flows includes at least one of the prioritized queues and at least one of the plurality of packet flows includes at least a first prioritized queue and a second prioritized queue, wherein the first prioritized queue has a different priority than the second prioritized queue, wherein the first prioritized queue and the second prioritized queue have a common RLP tag, and wherein each of the packet flows associates prioritized queues having common RLP tags; and
   a scheduler unit that schedules packet transmissions across the communication network based on prioritization numbers of the prioritized queues, the RLP tags, and the plurality of packet flows associated with the prioritized queues.

2. The device of claim 1, wherein the packet classifier unit classifies the received packets into different packet types.

3. The device of claim 1, wherein the communication network comprises an evolution data optimized (EV-DO) network.

4. The device of claim 1, wherein the packet classifier unit separates the received packets into the plurality of prioritized queues by separating voice packets into one or more of the prioritized queues and separating data packets into one or more of the prioritized queues, wherein the prioritized queues associated with the data packets are different than the prioritized queues associated with the voice packets.

5. The device of claim 1, wherein the packet classifier unit separates the received packets into the plurality of prioritized queues by separating video packets into one or more of the prioritized queues and separating data packets into one or more of the prioritized queues, wherein the prioritized queues associated with the data packets are different than the prioritized queues associated with the video packets.

6. The device of claim 1, wherein each of the plurality of packet flows defines a different error detection scheme relative to others of the plurality of packet flows.

7. The device of claim 1, wherein each of the plurality of packet flows defines a different packet loss scheme relative to others of the plurality of packet flows.

8. The device of claim 1, wherein when the device receives a message to re-transmit one or more of the received packets, the scheduler unit schedules re-transmissions prior to first transmissions regardless of priority.

9. The device of claim 1, wherein the scheduler unit schedules packet transmissions based on prioritization numbers of the prioritized queues and the plurality of packet flows associated with the prioritized queues by:
   scheduling packet transmissions for packets in a higher priority queue when packets are not currently being transmitted from the one of the plurality of packet flows associated with the higher priority queue; and
   scheduling packet transmissions for packets in a lower priority queue when packets are currently being transmitted from the one of the plurality of packet flows associated with the higher priority queue, wherein the lower priority queue is associated with a different one of the plurality of packet flows than the higher priority queue.

10. The device of claim 1, wherein after transmitting all of the packets in the plurality of packet flows, the scheduler unit determines if a flush time associated with any of the plurality of packet flows has expired and if so, schedules transmission of a last transmitted octet associated with one or more packet flows having an expired flush time.

11. The device of claim 1, wherein the scheduler unit schedules transmission of signaling message packets prior to scheduling transmission of any other packets.

12. A method of providing quality of service (QoS) for wireless packet transmission between a device and a base station in a communication network lacking QoS support at a Media Access Control (MAC) layer, the method comprising:
  receiving packets to be transmitted;
  tagging each of the received packets with a priority tag indicating a priority of the received packet and a Radio Link Protocol (RLP) tag indicating an RLP associated with the received packet;
  separating the received packets into a plurality of prioritized queues based on the priority tag of each received packet, wherein the prioritized queues are organized into packet flows such that each of the packet flows includes at least one of the prioritized queues and at least one of the packet flows include at least a first prioritized queue and a second prioritized queue, wherein the first prioritized queue has a different priority than the second prioritized queue, wherein the first prioritized queue and the second prioritized queue have a common RLP tag, and wherein each of the packet flows associates prioritized queues having common RLP tags; and
  scheduling packet transmissions based on prioritization numbers of the prioritized queues, the RLP tags, and the packet flows associated with the prioritized queues.

13. The method of claim 12, further comprising classifying the received packets into different packet types.

14. The method of claim 12, wherein the communication network comprise an evolution data optimized (EV-DO) network.

15. The method of claim 12, wherein separating the received packets into a plurality of prioritized queues includes separating voice packets into one or more of the prioritized queues and separating data packets into one or more of the prioritized queues, wherein the prioritized queues associated with the data packets are different than the prioritized queues associated with the voice packets.

16. The method of claim 12, wherein separating the received packets into a plurality of prioritized queues includes separating video packets into one or more of the prioritized queues and separating data packets into one or more of the prioritized queues, wherein the prioritized queues associated with the data packets are different than the prioritized queues associated with the video packets.

17. The method of claim 12, wherein each of the packet flows defines a different error detection scheme relative to others of the packet flows.

18. The method of claim 12, wherein each of the packet flows defines a different packet loss scheme relative to others of the packet flows.

19. The method of claim 12, wherein each of the packet flows includes a subset of the prioritized queues, wherein common RLP tags are associated with packets of the prioritized queues in each of the subsets.

20. The method of claim 12, further comprising receiving a message to re-transmit one or more packets, wherein scheduling packet transmissions based on prioritization numbers of the prioritized queues and the packet flows associated with the prioritized queues comprises scheduling re-transmissions prior to first transmissions regardless of priority.

21. The method of claim 12, wherein scheduling packet transmissions based on prioritization numbers of the prioritized queues and the packet flows associated with the prioritized queues comprises:
  scheduling packet transmissions for packets in a higher priority queue when packets are not currently being transmitted from the one of the packet flows associated with the higher priority queue; and
  scheduling packet transmissions for packets in a lower priority queue when packets are currently being transmitted from the one of the packet flows associated with the higher priority queue, wherein the lower priority queue is associated with a different one of the packet flows than the higher priority queue.

22. The method of claim 12, further comprising: after transmitting all of the packets in the packet flows, determining if a flush time associated with any of the packet flows has expired and if so, scheduling transmission of a last transmitted octet associated with one or more packet flows having an expired flush time.

23. The method of claim 12, further comprising scheduling transmission of signaling message packets prior to scheduling transmission of any other packets.

24. A non-transitory computer readable storage medium comprising computer readable instructions that, when executed in a device of a wireless communication network lacking quality of service (QoS) support at a Media Access Control (MAC) layer, cause the device to provide QoS for wireless packet transmission between the device and a base station in the wireless communication network, wherein upon execution the instructions cause the device to:
  receive packets to be transmitted;
  tag each of the received packets with a priority tag indicating a priority of the received packet and a Radio Link Protocol (RLP) tag indicating an RLP associated with the received packet;
  separate received packets into a plurality of prioritized queues based on the priority tag of each received packet, wherein the prioritized queues are organized into packet flows such that each of the packet flows includes at least one of the prioritized queues and at least one of the packet flows includes a first prioritized queue and a second prioritized queue, wherein the first prioritized queue has a different priority than the second prioritized queue, wherein the first prioritized queue and the second prioritized queue have a common RLP tag, and wherein each of the packet flows associates prioritized queues having common RLP tags; and
  schedule packet transmissions based on prioritization numbers of the prioritized queues, the RLP tags, and the packet flows associated with the prioritized queues.

25. The computer readable medium of claim 24, wherein the instructions cause the device to separate the received packets into a plurality of prioritized queues by separating voice packets into one or more of the prioritized queues and separating data packets into one or more of the prioritized queues, wherein the prioritized queues associated with the data packets are different than the prioritized queues associated with the voice packets.

26. The computer readable medium of claim 24, wherein the instructions cause the device to separate the received packets into a plurality of prioritized queues by separating video packets into one or more of the prioritized queues and separating data packets into one or more of the prioritized queues, wherein the prioritized queues associated with the data packets are different than the prioritized queues associated with the video packets.

27. The computer readable medium of claim 24, wherein each of the packet flows defines a different error detection scheme relative to others of the packet flows.

28. The computer readable medium of claim 24, wherein each of the packet flows defines a different packet loss scheme relative to others of the packet flows.

29. The computer readable medium of claim 24, wherein upon receiving a message to re-transmit one or more packets the instructions cause the device to schedule re-transmissions prior to first transmissions regardless of priority.

30. The computer readable medium of claim 24, wherein the instructions cause the device to schedule packet transmissions based on prioritization numbers of the prioritized queues and the packet flows associated with the prioritized queues by:
  scheduling packet transmissions for packets in a higher priority queue when packets are not currently being transmitted from the one of the packet flows associated with the higher priority queue; and
  scheduling packet transmissions for packets in a lower priority queue when packets are currently being transmitted from the one of the packet flows associated with the higher priority queue, wherein the lower priority queue is associated with a different one of the packet flows than the higher priority queue.

31. The computer readable medium of claim 24, wherein the instructions cause the device to determine if a flush time associated with any of the packet flows has expired after transmitting all of the packets in the packet flows, and if so, schedule transmission of a last transmitted octet associated with one or more packet flows having an expired flush time.

32. The computer readable medium of claim 24, wherein the instructions cause the device to schedule transmission of signaling message packets prior to scheduling transmission of any other packets.

33. A device that provides quality of service (QoS) for wireless packet transmission between the device and a base station in a communication network lacking QoS support at a Media Access Control (MAC) layer, the device comprising:
  a packet classifier configured to receive a plurality of packets and classify each of the plurality of packets based on predetermined classification criteria, the packet classifier tagging each of the packets according to a priority associated with the classification criteria and tagging each of the packets with a respective Radio Link Protocol (RLP) from a plurality of RLPs;
  a plurality of packet flows, each of the plurality of packet flows associated with a distinct RLP from the plurality of RLPs, each of the plurality of packet flows including at least one of the prioritized queues, and at least one of the packet flows including at least a first prioritized queue and a second prioritized queue, wherein the first prioritized queue has a different priority than the second prioritized queue, and wherein the first prioritized queue and the second prioritized queue have a common RLP tag;
  a packet queuing unit configured to separate the packets from the packet classifier into one of the prioritized queues in the plurality of packet flows based in part on the priority and RLP associated with the packet; and
  a scheduler unit configured to schedule packet transmissions based on prioritization numbers of the prioritized queues and the packet flows associated with the prioritized queues.

34. An apparatus that provides quality of service (QoS) for wireless packet transmission between the device and a base station in a communication network lacking QoS support at a Media Access Control (MAC) layer, the device comprising:
  means for receiving packets to be transmitted;
  means for tagging each of the received packets with a priority tag indicating a priority of the received packet and a Radio Link Protocol (RLP) tag indicating an RLP associated with the received packet;
  means for separating the received packets into a plurality of prioritized queues based on the priority tag of each received packet, wherein the prioritized queues are organized into packet flows such that each of the packet flows includes at least one of the prioritized queues and at least one of the packet flows include at least a first prioritized queue and a second prioritized queue, wherein the first prioritized queue has a different priority than the second prioritized queue, wherein the first prioritized queue and the second prioritized queue have a common RLP tag, and wherein each of the packet flows associates prioritized queues having common RLP tags; and
  means for scheduling packet transmissions based on prioritization numbers of the prioritized queues, the RLP tags, and the packet flows associated with the prioritized queues.

35. The apparatus of claim 34, wherein separating the received packets into a plurality of prioritized queues includes separating voice packets into one or more of the prioritized queues and separating data packets into one or more of the prioritized queues, wherein the prioritized queues associated with the data packets are different than the prioritized queues associated with the voice packets.

36. The apparatus of claim 34, wherein separating the received packets into a plurality of prioritized queues includes separating video packets into one or more of the prioritized queues and separating data packets into one or more of the prioritized queues, wherein the prioritized queues associated with the data packets are different than the prioritized queues associated with the video packets.

37. The apparatus of claim 34, wherein each of the packet flows defines a different error detection scheme relative to others of the packet flows.

38. The apparatus of claim 34, wherein each of the packet flows defines a different packet loss scheme relative to others of the packet flows.

* * * * *